(No Model.)
E. E. LATHAM, Dec'd.
M. S. LATHAM, Administratrix.
CLUTCH OPERATING MECHANISM.
No. 418,197. Patented Dec. 31, 1889.
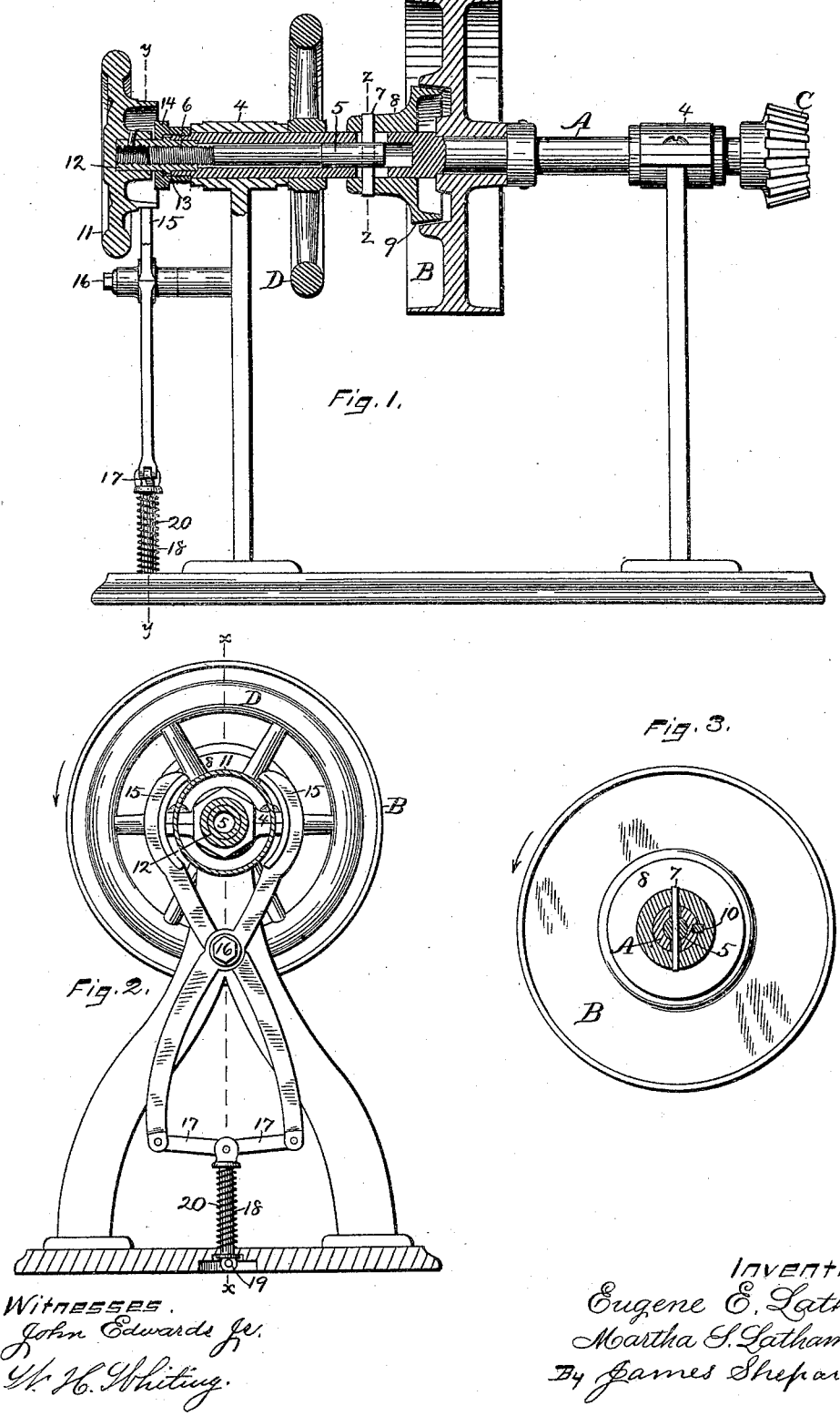
Witnesses.
John Edwards Jr.
W. H. Whiting.
Inventor,
Eugene E. Latham, dec'd
Martha S. Latham, Admx.
By James Shepard, Atty.

UNITED STATES PATENT OFFICE.

MARTHA S. LATHAM, OF WINDSOR LOCKS, CONNECTICUT, ADMINISTRATRIX OF EUGENE E. LATHAM, DECEASED.

CLUTCH-OPERATING MECHANISM.

SPECIFICATION forming part of Letters Patent No. 418,197, dated December 31, 1889.

Application filed August 23, 1889. Serial No. 322,498. (No model.)

*To all whom it may concern:*

Be it known that EUGENE E. LATHAM, late a citizen of the United States, residing at Windsor Locks, in the county of Hartford and State of Connecticut, did invent certain new and useful Improvements in Clutch-Operating Mechanisms, of which the following is a specification.

The invention relates to improvements in clutch-operating mechanisms, and the chief object of the improvement is to place the clutch under better control.

In the accompanying drawings, Figure 1 is a longitudinal section on line $x\ x$ of Fig. 2, partly in elevation, of the clutch and its operating mechanism. Fig. 2 is a side elevation of the same with the operating-wheel and base in vertical section on line $y\ y$ of Fig. 1, and Fig. 3 is a transverse section of parts thereof on line $z\ z$ of Fig. 1.

A designates a shaft mounted in suitable bearings—as, for instance, 4 4—and bearing the driving-pulley B, arranged to revolve loosely upon said shaft. The shaft A is also represented as provided with a gear-wheel C, which may be connected with any desired machinery or machine. The shaft A is bored out at one end to receive the clutch-operating rod 5, one end of which is threaded, as at 6, Fig. 1, and the opposite end is provided with a key 7, that connects said clutch-operating rod with the sliding clutch 8, which clutch is provided with a conical face 9, for engagement with a conical recess at one side of the driving-pulley B, as in a well-known construction of friction-clutches, and for which other sliding-clutch mechanism may be substituted. This sliding clutch 8 is keyed to the shaft A by a spline 10, Fig. 3, so that it necessarily revolves with said shaft, while it is free to slide longitudinally thereon.

11 designates an operating-wheel provided with a central nut 12, which fits the threaded end 6 of the clutch-operating rod 5. Said nut is also provided with a shouldered flange 13, one side of which rests against the end of the shaft A, and the other side of which is engaged by the inwardly-projecting flange at the outer end of the holding-nut 14, which nut is screwed firmly up against a shoulder on the end of the shaft A, whereby the nut 12 and operating-wheel 11 are free to revolve independently of the shaft and holding-nut 14. The balance-wheel D is merely for the purpose of equalizing the motion of the shaft A and has no special connection with the improvement. The operating-wheel 11 is provided with an inwardly-projecting hub, and upon each side thereof are arranged friction-brakes 15 15, which are pivoted to the frame at 16, and have between their lower ends links 17, the meeting ends of which are connected with an operating-rod 18, having an eye 19, Fig. 2, at its lower end. A spring 20 around the rod 18 throws the links 17 17 upwardly and keeps the brakes 15 15 out of contact with the hub of the operating-wheel 11.

Power is applied to the pulley B by an ordinary belt, so as to revolve said pulley in the direction indicated by the darts in Figs. 2 and 3, the pulley revolving freely, while the shaft remains stationary. When desired to start the machinery, it is only necessary to turn the operating-wheel 11 in the same direction, whereby the clutch-operating rod is unscrewed from the nut 12 and the sliding clutch 8 is forced into engagement with the wheel B, thereby causing the shaft to revolve with said wheel. In order to stop the shaft and the machinery driven thereby, it is only necessary to apply friction to the operating-wheel, so as to prevent it from revolving with the shaft, whereby the clutch-operating rod is screwed into the nut and the clutch mechanism immediately withdrawn and released. When the operator is in close proximity to the clutch, the friction may be applied to the operating-wheel by grasping its periphery with one hand. If, however, it is to be operated from a distance, a cord or wire may be fastened to the eye 19 of the brake-operating rod 18, and, running over suitable pulleys or guides, may be operated from any distant point to pull the connecting ends of the links 17 17 downwardly, and thereby bring the brakes 15 15 against the hub of the operating-wheel for releasing the clutch. Even if the clutch mechanism is to be operated at a point near the clutch any ordinary brake mechanism may be applied to the operating-wheel; but the device works so quickly and easily that the application of the hand to the wheel is all that is necessary.

The device is specially adapted for use with heavy machinery which may for any reason be desired to stop instantaneously, an example of which machinery is found in the calendar-rolls of paper-mills.

What is claimed as the invention of said LATHAM is—

1. The combination of the driving-wheel B and sliding clutch with the shaft A, the clutch-operating rod threaded at one end, as at 6, and the operating-wheel 11, provided with a nut fitted to the threaded end of said rod and held against longitudinal movement at the end of said shaft, substantially as described, and for the purpose specified.

2. The combination of the driving-wheel and sliding clutch with the shaft A, the clutch-operating rod threaded at one end, as at 6, the operating-wheel 11, provided with a nut fitted to the threaded end of said rod and held against longitudinal movement at the end of said shaft, the brakes 15, and their operating mechanism, substantially as described, and for the purpose specified.

3. The combination of the driving-wheel and sliding clutch with the shaft A, the clutch-operating rod 5, having the threaded end 6, the nut 12, provided with the shouldered flange 13, the operating-wheel 11, rigidly connected with said nut, and the holding-nut 14, having the inwardly-projecting flange and screwed upon the end of the shaft A to secure the nut 12 against longitudinal movement, substantially as described, and for the purpose specified.

MARTHA S. LATHAM,
*Administratrix of Eugene E. Latham, deceased.*

Witnesses:
J. W. JOHNSON,
EDWIN UPTON.